United States Patent [19]

Seymour

[11] 4,314,836
[45] Feb. 9, 1982

[54] GLASS SHEET TEMPERING APPARATUS WITH NOZZLE ARRANGEMENT PROVIDING FLUID ESCAPE PATHS AND METHOD OF TEMPERING GLASS SHEETS

[75] Inventor: Samuel L. Seymour, Oakmont, Pa.

[73] Assignee: PPG Industries, Inc., Pittsburgh, Pa.

[21] Appl. No.: 174,961

[22] Filed: Aug. 4, 1980

[51] Int. Cl.³ .............................................. C03B 27/04
[52] U.S. Cl. ....................................... 65/114; 65/115; 65/348; 65/351
[58] Field of Search ................. 65/114, 115, 348, 349, 65/350, 351

[56] References Cited

U.S. PATENT DOCUMENTS

| | | | |
|---|---|---|---|
| 2,401,442 | 6/1946 | Weihs | 65/115 |
| 3,125,430 | 3/1964 | Richardson | 65/114 |
| 3,186,815 | 6/1965 | Jochim | 65/115 |
| 3,294,519 | 12/1966 | Fickes | 65/348 |
| 3,332,761 | 7/1967 | Fredley et al. | 65/25 |
| 3,353,946 | 11/1967 | McMaster | 65/348 |
| 3,455,671 | 7/1969 | McMaster | 65/182 |
| 3,776,712 | 12/1973 | Wilde | 65/348 |
| 3,846,106 | 11/1974 | Seymour | 65/104 |

FOREIGN PATENT DOCUMENTS

42-26320 12/1967 Japan ....................................... 65/115

Primary Examiner—Arthur D. Kellogg
Attorney, Agent, or Firm—Donald Carl Lepiane; Edward I. Mates

[57] ABSTRACT

In tempering a glass sheet, particularly a glass sheet having at least one major dimension more than 0.5 meter, by quenching said sheet with cold tempering medium while at a tempering temperature, prior art tempering apparatus developed insufficient temper particularly in the central portion of the glass sheet, as evidenced by fragments from the central portion exceeding code requirements for maximum size on destruction testing. The present invention provides a novel construction and arrangement of the tempering medium supply system that provides relatively wide escape paths in the direction of the glass sheet thickness for blasts of tempering medium applied toward the central portion of the glass sheet compared to the escape paths provided in said direction for blasts of tempering medium applied to the portion of the glass sheet beyond the central portion. The resulting tempered glass sheets processed using the present invention have fragments that meet code requirements in the central portion as well as the portion beyond the central portion when subjected to destruction testing.

13 Claims, 6 Drawing Figures

GLASS SHEET TEMPERING APPARATUS WITH NOZZLE ARRANGEMENT PROVIDING FLUID ESCAPE PATHS AND METHOD OF TEMPERING GLASS SHEETS

BACKGROUND OF THE INVENTION

1. Field of the Invention

The present invention relates to glass sheet tempering apparatus and particularly relates to the tempering of large glass sheets, especially those that are shaped prior to being tempered. When glass sheets are tempered, each glass sheet in turn is heated above its annealing range and then rapidly cooled to set the surfaces of the glass sheet while the center is still hot. This action results in the sheet having its surfaces stressed in compression while the intermediate portion is stressed in tension.

The stress pattern imparted to temper glass results in a much stronger sheet than untempered glass, because the glass surfaces, by virtue of being stressed in compression, are much more able to withstand external forces than untempered glass sheets which are not provided with such large compression stresses in the surface area. Moreover, when the outer surface of the glass is penetrated, tempered glass breaks up into small, relatively harmless, smoothly surfaced particles. In contrast, annealed glass fractures more readily, and when fractured, breaks into relatively dangerous, large, jagged fragments.

The uniformity of the size of the shattered particles indicates the uniformity of temper of the glass. The smaller, smoother particles of shattered tempered glass are much safer than the jagged fragements of untempered glass.

More specifically, in a typical tempering operation, a glass sheet is heated nearly to its softening point and then quickly chilled by uniformly exposing the opposite surfaces of the heated glass sheet to streams of a tempering fluid, such as air, arranged to cool both surfaces uniformly and simultaneously. The fluid is disposed through two opposed, spaced plenum chambers, each provided with a set of nozzles. Each set of nozzles faces a different major surface of the glass sheet.

The prior art considered it a prerequisite to uniform tempering to have an even distribution of the cooling air over the glass surfaces. This is usually accomplished by blasting air through a plurality of identical, uniformly spaced, elongated nozzles extending through apertures in apertured walls of the plenum chambers. The nozzles are either moved orbitally or reciprocated transversely of their length through an amplitude sufficient to insure that each increment of the glass sheet area is swept by at least one of the reciprocating nozzles. The distance between the nozzle orifices and the adjacent sheet surfaces has been kept as uniform as possible in order to strive for the goal of uniform tempering of the glass sheet.

It is necessary to impart relative movement between the nozzles moving in unison relative to the glass sheet to avoid nonuniform cooling of the glass. When the nozzles are not moved relative to the major glass surfaces or vice versa, the tempering medium blasts are directed against fixed locations on the glass. Fixed air blasts cool the fixed locations opposite the blasts rapidly while other locations adjacent to the fixed locations are not cooled as rapidly. Without such relative movement, patterns of iridescence form on the surface of the tempered glass. These patterns of iridescence are very annoying when viewed in reflection or in polarized light.

The glass sheet tempering art has developed many techniques for imparting relative motion between the nozzles that face the opposite surfaces of the glass sheet and the major surfaces of said sheet. Some of these involve linear reciprocation of the nozzles in unison. Others involve linear reciprocating movement of glass sheets past a pair of arrays of fixed opposing nozzles. Others involve applying elliptical or circular orbital movement of nozzles relative to a glass sheet supported at a fixed position.

By providing relative movement of the nozzles relative to the major surfaces of the glass sheet, and by applying the streams of air or other tempering medium through the nozzles by pressure from a common source, prior art tempering apparatus provided substantially uniform tempering for flat glass and gently curved glass of relatively small and intermediate sizes. However, as the size and/or shape of automobile backlights and sidelights become larger and more complicated, it has become more and more difficult to temper glass sheets adequately. It has become necessary to supply air or other tempering medium at a greater rate of flow for larger sizes than for smaller sizes in order to assure that the glass is adequately tempered.

The prior art correlated one of the problems of inadequate tempering of the central portion of large glass sheets and/or those having complicated curvatures with the inability to remove air blasted toward the central portion of the glass sheet as readily as that blasted to the portion outside said central portion so as to enable fresh cool tempering medium to replace the warmed tempering medium. The prior art recognized the correlation of the long escape path from the center to the edge of the glass sheet with inadequate center portion temper and relatively large particle size in the central portion after destruction testing.

According to one proposal to solve this problem, the wall of each plenum chamber facing the central portion of a glass sheet undergoing quenching has a greater proportion per unit area apertured than the remainder of the wall facing the portion of the glass sheet outside the central portion. Such a construction causes a slight pressure gradient in the tempering medium from the central region to the outermost regions of the space within which the glass sheet is supported between the plenum chambers for tempering. This slight pressure gradient results in a continuous outward flow from the central portion of the glass to its margin and helps remove air from the vicinity of the glass sheet surface after the relatively cool air supplied through the apertured wall of the plenum chamber has cooled the heated glass surface and has in turn been heated by heat exchange with the glass.

Providing larger openings in the apertured walls of the plenum chamber in the center portion than in the portions beyond the central portion requires more power to operate compressors or fans that supply cool air to the various nozzles to establish a flow rate providing a given temper level. In view of the increasing cost of energy in recent years, it would be desirable to develop an alternate technique that does not involve the use of so much energy to develop a desired degree of temper.

2. Description of Patents of Interest

U.S. Pat. No. 2,401,442 to Weihs uses a pair of axially movable arrays of nozzles that move alternately toward and away from a glass sheet surface in mutually opposite directions to increase the intensity with which a plurality of air streams impinge on each surface of the glass sheet while at the same time to decrease the intensity with which adjacent air streams impinge upon the surfaces of the glass sheet and alternately increasing and decreasing the intensity of each of the sets of streams periodically during the cooling of the glass sheet. The purpose of this invention is to avoid irridescent spots that result from non-uniform cooling of the glass sheet due to the more rapid cooling of regions facing the cool air blasts compared to other regions intermediate the rapidly cooled regions. All the nozzles in each array are at approximately equal, changing distances from the adjacent glass surface.

U.S. Pat. No. 3,125,430 to Richardson relates to glass sheet tempering apparatus that arranges cold gas supply nozzles in bunches of mutually divergent nozzles for the delivery of tempering medium defining a mean direction of flow in such a way as to permit ready escape of tempering medium that is warmed on approaching the glass surface along paths of escape intermediate the supply paths. This arrangement permits additional tempering medium from the divergent nozzles of adjacent bunches. All the openings at the ends of the nozzles that supply tempering medium are at approximately the same distance from the adjacent glass surface during the application of tempering medium.

U.S. Pat. No. 3,186,815 to Jochim discloses a glass tempering apparatus designed to temper different portions of the glass to different degrees of temper by providing a separate set of nozzles moveable relative to the remaining tempering nozzles in a direction parallel to the thickness of a glass sheet being tempered. The purpose of this invention is to provide different portions of the tempered glass sheet with different properties that are associated with different degrees of temper.

U.S. Pat. No. 3,294,519 to Fickes discloses glass sheet tempering apparatus in which air under pressure is supplied to a pair of opposed plenum chambers and imparted through nozzles having a larger proportion of tempering medium-imparting area per unit cross section area in the central portion compared to that of the portions exterior of the central portion. The purpose of this patent is to increase the flow rate of tempering medium against the central portion of the glass sheet undergoing tempering so as to cause a pressure gradient in the tempering medium parallel to the major surfaces of the glass sheet from the central region to the marginal portion of the glass sheet.

The pressure gradient so established permits tempering medium to escape more readily from the central portion of the glass sheet after it chills the glass surfaces, permitting the application of additional tempering medium, particularly in the central portion of the glass sheet. Establishing the pressure gradient in this manner requires additional power to provide additional flow of cold tempering medium in the central region of the plenum chamber which faces the central portion of the glass sheet. The need for additional power consumption to insure adequate temper in the central portion of large glass sheets leaves something to be desired and it would be desirable for the glass sheet tempering art to develop a way of tempering glass sheets at minimum power consumption while permitting the tempering medium applied to the opposite major surfaces of the glass sheet to escape readily throughout the entire extent including its central portion between the apertured walls of the plenum chamber and the major surfaces of the glass sheet.

U.S. Pat. No. 3,332,761 to Fredley et al. discloses a gas hearth bed having exhaust passages interspersed between modules for delivering fluid to effect heat exchange on application toward a major glass sheet surface. The fluid delivery openings of the modules are arranged in a surface parallel to the surface of a glass sheet conveyed past the gas hearth bed. In this patent, the surface changes gradually from a flat surface to a curved surface.

U.S. Pat. No. 3,353,946 to McMaster discloses a blast head structure for apparatus to temper flat glass sheets. Weir structures separate the pressure supply areas from the exhaust areas to throttle the flow of tempering fluid therebetween.

U.S. Pat. No. 3,455,671 to McMaster discloses a gas support bed having exhaust passages with flared ends disposed within and surrounded by supply passages. The flared ends of the exhaust passages divert fluid flows directed through the supply passages to direct the flows at an angle less than 90 degrees toward the surface of a glass sheet to be heat treated. The diverted fluid flows create static fluid pressure between adjacent inlet passages that force the fluid to turn more than 180 degrees in flowing to the exhaust passages. A bed of fluid of approximately uniform thickness is thus provided between the gas support bed and the adjacent surface of the glass sheet.

U.S. Pat. No. 3,776,712 to Wilde discloses a two-stage cooling apparatus comprising a gaseous support type first stage followed by a rotating roller support having a row of spaced nozzles between each pair of adjacent rolls. Since the glass is subject to fracture during the second stage, the latter is designed with an open structure to allow shattered glass to fall out of the path of travel of the succeeding sheet of glass and to permit ease of clearance of cullet. The use of two cooling stages allows the second cooling stage to operate with cooling tempering medium at a higher pressure than the first cooling stage.

SUMMARY OF THE INVENTION

It has now been found that glass sheets can be tempered substantially uniformly throughout their entire extent by utilizing glass tempering apparatus having a system of delivery pipes and nozzles so constructed and arranged as to provide many air escape paths between the delivery pipes and nozzles that permit cold tempering medium applied toward the central portion of the glass sheet being tempered to escape in the direction of glass sheet thickness. The present invention reduces the percentage of the tempering medium that is applied toward the central portion of the glass sheet that escapes along relatively long paths parallel to the major glass sheet surfaces, thus mingling with the escaping tempering medium that is applied toward the glass sheet outside of its central portion. Shortening the path of escape for tempering medium from its points of impingement against the glass surfaces to the surrounding atmosphere beyond the edge of the glass sheet reduces the amount that the escaping tempering medium is heated en route to the surrounding atmosphere, and also reduces the tendency of the tempering medium applied outside the central portion to throttle the escape of tempering medium applied against the central portion of the glass sheet into the surrounding atmosphere. As a result, the present invention obtains a more uniform and higher degree of temper in a glass sheet of given dimensions chilled by a given volume of cold tempering medium than prior art tempering devices, as evidenced by the smaller size of particles of tempered glass obtained from the central portion on destruction testing compared with prior art test results on tempered glass processed on prior art apparatus.

The present invention will be understood more clearly in the light of a description of a preferred embodiment that follows.

BRIEF DESCRIPTION OF THE DRAWINGS

In the drawings that form part of the description of the preferred embodiment.

DETAILED DESCRIPTION OF PREFERRED EMBODIMENTS

Figure 1:
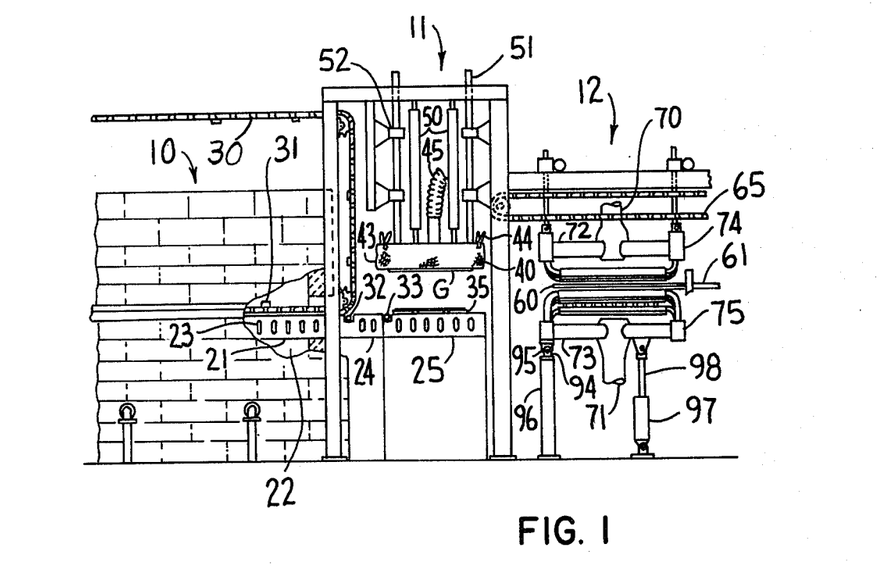
FIG. 1 is a longitudinal side view of a portion of a glass sheet tempering apparatus modified according to the present invention to provide escape paths for tempering medium in directions essentially normal to the major glass sheet surfaces in the central portion of the glass sheet.

In FIG. 1 there is shown a bending and tempering line including a furnace 10 (only the exit end of which is shown), a bending station 11 and a tempering station 12. The tempering station is modified according to the present invention to provide means to facilitate the escape of tempering medium, especially from the central portion of the glass sheet.

Any arrangement known in the art for heating and conveying a series of horizontally disposed glass sheets may be employed in connection with the bending process of the present invention. Accordingly, glass sheets may be conveyed on rolls through a heating furnace for entry into a so-called horizontal press bending station as in U.S. Pat. No. 4,197,108 to Robert G. Frank et al. or conveyed on a gas hearth through a heating furnace for entry into a bending station where they are shaped by a drop forming process, such as depicted in U.S. Pat. No. 4,204,853 to Samuel L. Seymour, or by any other suitable bending process, before they are tempered by sudden and rapid cooling. While the specific embodiment of this invention will be described in conjunction with modified tempering apparatus for cooling horizontally disposed glass sheets, it is also understood that the present invention may also be employed to rapidly chill large glass sheets that are supported vertically, either by tongs as in U.S. Pat. No. 3,290,136 to Dean L. Thomas or otherwise supported in an upright position, as in U.S. Pat. No. 3,341,313 to Robert W. Wheeler and Charles R. Davidson, Jr. for heat treatment prior to the sudden cooling step.

The furnace 10 of an illustrative embodiment is preferably of the gas support type wherein the sheets of glass are supported on a layer of hot gases as they are heated and conveyed through the furnace. Examples of gas support furnaces for heating glass sheets may be found in U.S. Pat. No. 3,233,501 to Fredley et al. and in U.S. Pat. No. 3,332,759 to McMaster et al.

In the cut-away portion of the furnace in FIG. 1, a gas support bed is seen defined by a hearth block 21. A large number of vertical bores extend through the bed. Some of the bores communicate the upper surface of the hearth block with hot, pressurized gases from a plenum chamber 22 and others communicate the top surface of the hearth block with cross-bored exhaust passages 23. The same hearth block construction continues beyond the furnace exit to an extension block 24 and a support block 25 in the bending station 11.

Referring again now to FIG. 1, there is shown one typical arrangement for propelling the glass sheets through the furnace as they are supported on a film of hot gases. The conveying mechanism there comprises a pair of parallel, endless chains 30 flanking the path of the glass sheets inside the furnace and joined by a plurality of pusher bars 31. At the exit of the furnace, each glass sheet may be released from the chain conveying means and driven at an accelerated speed across the extension block 24 and into the bending station by means of an upstream roll 32 and a downstream roll 33. Passage of the glass sheets from the furnace may be aided by providing the blocks 21, 24, and 25 with a slight downward slope (e.g., 1 degree to 2 degrees). Typically, sufficient gas pressure is maintained between the blocks and the glass sheets so as to float the glass sheets about 1/16 inch (1.6 millimeters) above the upper surface of the blocks. Upstream roll 32 and downstream roll 33 project above the upper surface of the blocks just enough to make contact with the undersides of the glass sheets.

The upstream roll 32 is located approximately at the exit of the furnace 10. The downstream roll 33 is longitudinally spaced downstream of the upstream roll 32 by a distance that preferably is considerably less than the dimension of a glass sheet along its path of travel while being treated by the bending apparatus. In the event longer sheets are being treated, it may be necessary to interpose additional rolls (not shown) intermediate the upstream roll 32 and the downstream roll 33.

All of the rolls are mounted for rotation about axes extending normal to said path of travel provided for the glass sheets over the blocks 21, 24 and 25. The upper common tangent of the upstream roll 32 and downstream roll 33 is at an elevation to contact the lower surface of the glass sheet or sheets that enter the bending station. The number of rolls beginning with the upstream roll 32 and ending with the downstream roll 33 should be the minimum required to deliver the glass sheet so that its forward end is received in approximate alignment with aligning means comprising a locator frame 35 of the type covered in U.S. Pat. No. 4,204,853 to S. L. Seymour.

When a glass sheet has arrived in the bending station, its forward progress is stopped by glass sheet aligning means comprising the locator frame 35 resting on hearth block 25. The locator frame defines at least one open-ended "pocket" within which the forward portion of a glass sheet may be received. The glass sheet receiving pocket is contoured to correspond approximately to the outline of the leading portion of the glass sheet so that the glass sheet, when urged into engagement with the locator frame, will become seated firmly and nest within the pocket with little or no freedom of movement. The locator frame 35 is spaced from the downstream roll 33 a precisely determined distance so that the trailing edge of a properly aligned glass sheet is approximately directly over the center of the downstream roll 33. The downstream roll 33 continues rotating so as to urge the glass sheet into the pocket of the locator frame as the glass sheet floats on the layer of hot gases. The frictional force between the downstream roll 33 and the glass sheet is minimized and restricted to the trailing edge of the glass sheet in order to avoid scuffing the glass, but is sufficient to drive the floating glass sheet into an equilibrium position in alignment with the pocket of the locator frame and to retain the glass sheet therein. Such an aligning arrangement readily lends itself to processing a plurality of glass sheets side by side.

Directly overlying the locator frame 35 is a glass sheet holder in the form of a vacuum platen 40. The vacuum platen is comprised of a hollow chamber having a flat bottom plate through which a large number of perforations extend. In order to protect the surface of the hot glass sheets, the underside of the vacuum platen is covered with a protective cover 43 of a porous material that is soft and fluffy, and which may be a stretchable knit fiber glass fabric as disclosed in U.S. Pat. No. 3,148,968 to J. H. Cypher et al. The cover 43 may be held in place by a plurality of clamps 44. The hollow interior of the vacuum platen communicates with a source of vacuum by means of a flexible conduit 45. The area of the vacuum platen should exceed the total area of the largest glass sheet or sheets to be received at one time in the locator frame 35. For the greatest versatility, the vacuum platen may cover substantially the entire area of support block 25.

The flatness and rigidity of the bottom plate of the vacuum platen are important features of a preferred embodiment of the present invention. Any significant deviation from flatness can result in distortion being imparted to the glass sheets. Thus, the bottom plate should be fabricated with careful attention to providing a flat bottom surface and should be sufficiently rigid to avoid any bending or warping during use. Preferably, the bottom plate is a relatively thick, single piece of heat-resistant metal, such as stainless steel, although in some cases it may be possible to use thinner stock material with reinforcement members welded to the interior surface. As an example of the preferred one-piece construction, a stainless steel thickness of at least one-half inch (13 millimeters), preferably at least ⅝ inch (16 millimeters), has been found suitable for a plate 32 inches by 78 inches (81 centimeters by 2 meters). In that example, the interior of the vacuum platen was 3 inches (7.6 centimeters) tall.

The vacuum platen is provided with means for vertical reciprocation, such as hydraulic cylinders 50 and guide rods 51, as shown in FIG. 1. The guide rods 51 may slide in fixed, annular sleeves 52. The cylinders 50 reciprocate the vacuum platen between a raised position, as shown in FIG. 1, and a lowered position in which the platen is brought closely adjacent to, or in contact with, the locator frame 35 and the glass sheet or sheets held by the locator frame. When the vacuum platen is in the lowered position, sufficient vacuum is applied to draw the glass sheet into contact with the platen and to be lifted by the vacuum platen as the vacuum platen is raised. The platen need not come into contact with the glass sheets in order to pick them up. Merely approaching within 1/32 inch (0.8 millimeter) to about 1/16 inch (1.6 millimeters) has been found sufficient to lift the glass sheets, although this may vary depending upon the amount of vacuum applied and the weight of the glass.

Additionally, the amount of vacuum required, the number of perforations in the vacuum platen, and the diameter of the perforations are interdependent. It is desirable to keep the perforations small in number and diameter so as to minimize the power requirement for maintaining a vacuum in the vacuum platen, but there should be enough perforations so that a relatively uniform distribution of the perforations will overlie each portion of the smallest piece of glass to be processed. A spacing of about one perforation per square inch (6.5 square centimeters) has been found to be suitable for most purposes. Perforation diameters larger than 0.075 inch (1.9 millimeters), for example about 0.090 inch (2.3 millimeters), have been found satisfactory with a vacuum of 4 inches (10 centimeters) water (gauge). These data pertain to the processing of 3 millimeter thick sheets of soda-lime-silica float glass of standard commercial composition.

At least two layers of porous fiber glass cloth are included in the cover 43. The cover is free of any perforations extending through the thickness thereof. The porosity of the cover results from the inherent porosity of the fiber glass fabric.

Such porosity makes it possible to use larger perforations in the flat bottom plate of the vacuum platen 40, which facilitates sucking the glass sheet against the vacuum platen. At the same time, the interposition of the porous, fiber glass cloth cover avoids dimpling the heat-softened glass sheet in its regions that would engage the perforations in the absence of the porous cover. The layers of the porous fiber glass cover 43 separate the glass sheet from direct contact against the apertured metal plate and also provide innumerable, narrow, tortuous passages through which vacuum drawn through the perforations draw the glass sheet toward the vacuum platen 40. The cross sections of these individual passages are so small and the cushiony effect of the fiber glass layers is such that there is virtually no dimpling effect on the glass sheet in comparison to what happens when the glass sheet engages the apertured plate directly or even in comparison to what happens when the glass sheet engages a fiber glass cover 43 having perforations therethrough that coincide with the perforations in the apertured bottom plate of the vacuum platen 40.

Typical satisfactory arrangements of perforations are rectangular or diamond shaped arrays, preferably with the perforations arranged in parallel rows of perforations, with the adjacent rows spaced from one another in a direction transverse to the length of the rows by a distance approximately the distance between adjacent perforations in a given row.

For round perforations, the following arrangements of perforations and spaces between perforations have been found to be suitable. These arrangements are reported in Table I.

TABLE I

ARRANGEMENTS SUGGESTED FOR DIFFERENT SIZED PERFORATIONS

| Diameter of Perforations | Distance between Perforations in Rows and from Row to Row |
|---|---|
| 5/64 inch (78 mils-1.98 mm) | 3/4 inch (19.05mm) |
| 3/32 inch (94 mils-2.38mm) | 1 inch (25.4mm) |
| .11 inch (110 mils-2.79mm) | 1.5 inch (38.1mm) |

Table II indicates the amount of suction needed to hold glass sheets of different thicknesses against an apertured wall of a vacuum platen, assuming that the glass sheet engages half the perforations of the apertured wall while the other half of the perforations surround the perforations that engage the glass sheet. Table II also indicates the maximum amount of vacuum in terms of height of water column that overcomes the need to support float glass sheets of different thicknesses against the apertured plate and also provides enough force to lift the glass sheet into engagement against the soft, fluffy, porous, fiber glass fabric cover without compressing the cover to such an extent that the cover loses its soft, fluffy and porous properties.

TABLE II

SUCTION FORCE SUGGESTED FOR DIFFERENT GLASS THICKNESSES

| Glass Thickness | Water Column Required to Hold Glass | Maximum Water Column to Lift Glass Without Undue Cloth Marks |
|---|---|---|
| 1/4 inch (6.35mm) | 6.2 inches (155 mm) | 9.0 inches (229mm) |
| 3/16 inch (4.76mm) | 4.7 inches (120mm) | 7.5 inches (172mm) |
| 5/32 inch (3.97mm) | 4.0 inches (102mm) | 6.0 inches (152mm) |
| 1/8 inch (3.18mm) | 3.1 inches (78mm) | 4.5 inches (115mm) |

With the glass sheet or sheets drawn against its underside by vacuum, the platen 40 is raised to the elevated position as shown in FIG. 1 so as to leave sufficient clearance to insert an outline shaping mold 60 between the support block 25 and the platen. The shaping mold conforms to the outline and contour desired for the bent glass sheets and is preferably constructed in accordance with the disclosure of U.S. Pat. No. 3,973,943 to S. L. Seymour, the disclosure of which is hereby incorporated by reference. The shaping mold is preferably of the outline ring type, light in weight and notched along its upper edge in order to provide minimal interference with the flow of tempering medium during tempering.

The shaping mold is carried on a shuttle 61 by which the shaping mold is translated horizontally through the bending, tempering and unloading stations. In the specific embodiment illustrated, the shuttle is driven along a horizontal path by an electric motor (not shown) driving a continuous chain 65 to which the upper ends of braces (not shown) are affixed. The braces form part of the shuttle.

When the vacuum platen 40 engaging a glass sheet has been raised to a height above the elevation of the shaping mold 60, the shuttle is driven to the left, as viewed in FIG. 1, to bring the bending mold into direct alignment beneath the sheet of glass elevated on the vacuum platen. Typically, the distance between the vacuum platen and the support block 25 at this point may be about 6 to 8 inches (15 to 20 centimeters). This distance will have an effect on the rate at which the glass sheet loses heat, since a higher elevation raises the glass sheet into a cooler environment. This effect may be used to "fine tune" the temperature (and thus the viscosity) at the moment the glass sheet is dropped onto the shaping mold.

The uppermost extent of the shaping mold when in position directly beneath the glass sheet is spaced from the glass sheet a distance greater than the minimum required to clear the glass sheet, so that when the glass sheet is released from the vacuum platen, it will fall a distance onto the shaping mold sufficient to generate a substantial bending force on the glass upon impact. In the typical case where the contour of the shaping mold includes points of maximum elevation, the falling glass sheet first contacts these high points, and a bending moment about these points is generated which forces the remainder of the glass sheet to bend downwardly until substantially complete contact is made with the shaping mold. A suitable distance between the vacuum platen and the high points of the shaping mold has been found to be about 1 to 2 inches (2.5 to 5 centimeters), and about 2 to 6 inches (5 to 15 centimeters) at the low points of the mold. The precise distance through which the glass falls will depend upon the weight and temperature of the glass, the degree of curvature to be imparted to the glass, and the geometry of the particular shape, and in unusual cases may vary beyond the distance ranges given previously.

Release of the glass sheet from the vacuum platen is carried out by reducing the vacuum to an amount insufficient to support the glass sheet. This may be accomplished conveniently by opening a valve to bring the interior of the vacuum platen into communication with atmospheric pressure. Or in some cases, it may be desirable to expedite the release of the glass from the platen by following a rapid decay of the vacuum with a rapid buildup to a positive pressure.

Another optional feature is to provide the vacuum platen with a plurality of separately controllable vacuum zones so that the vacuum may be released nonuniformly. For example, it may be beneficial in some cases to release the edge portions and the central portion of a glass sheet at different times. By delaying the release of the central portion, a slight reverse bend may be imparted to the glass, which may be helpful in avoiding excessive center sag when the glass sheet is dropped onto a concavely contoured outline shaping mold. Conversely, differential vacuum release may be utilized to accentuate a relatively deep bend which may be otherwise difficult to attain by impact force alone.

The momentum imparted to the glass sheet by its free fall onto the shaping mold preferably provides essentially the sole bending force for conforming the glass sheet to the contour of the shaping mold. Although some minor amount of sagging due to the force of gravity may take place after the glass sheet has come to rest on the shaping mold, its magnitude is insignificant relative to the bending produced by the momentum-generated force in the preferred mode of operation. Sagging is a relatively slow process, and in the present invention, tempering is preferably initiated in the minimum amount of time, thereby providing insufficient time for a significant amount of gravity-induced sagging to take place.

On the other hand, for some difficult bends it may be desirable to delay the start of tempering so as to permit a significant amount of additional sagging to take place after the glass sheet has dropped onto the mold. Although slower than the preferred mode, such a technique would be considerably faster than gravity sagging alone since the initial dropping of the glass onto the mold would accomplish a substantial part of the bending very quickly.

Upon receiving the glass sheet, the shaping mold is immediately transferred out of the bending station into the cooling station 12. The cooling station includes upper and lower fluid delivery systems that supply blasts of tempering medium (usually air) onto opposite sides of the glass sheet so as to rapidly cool surface portions of each glass sheet, thereby imparting a temper to the glass sheet.

Figure 2:
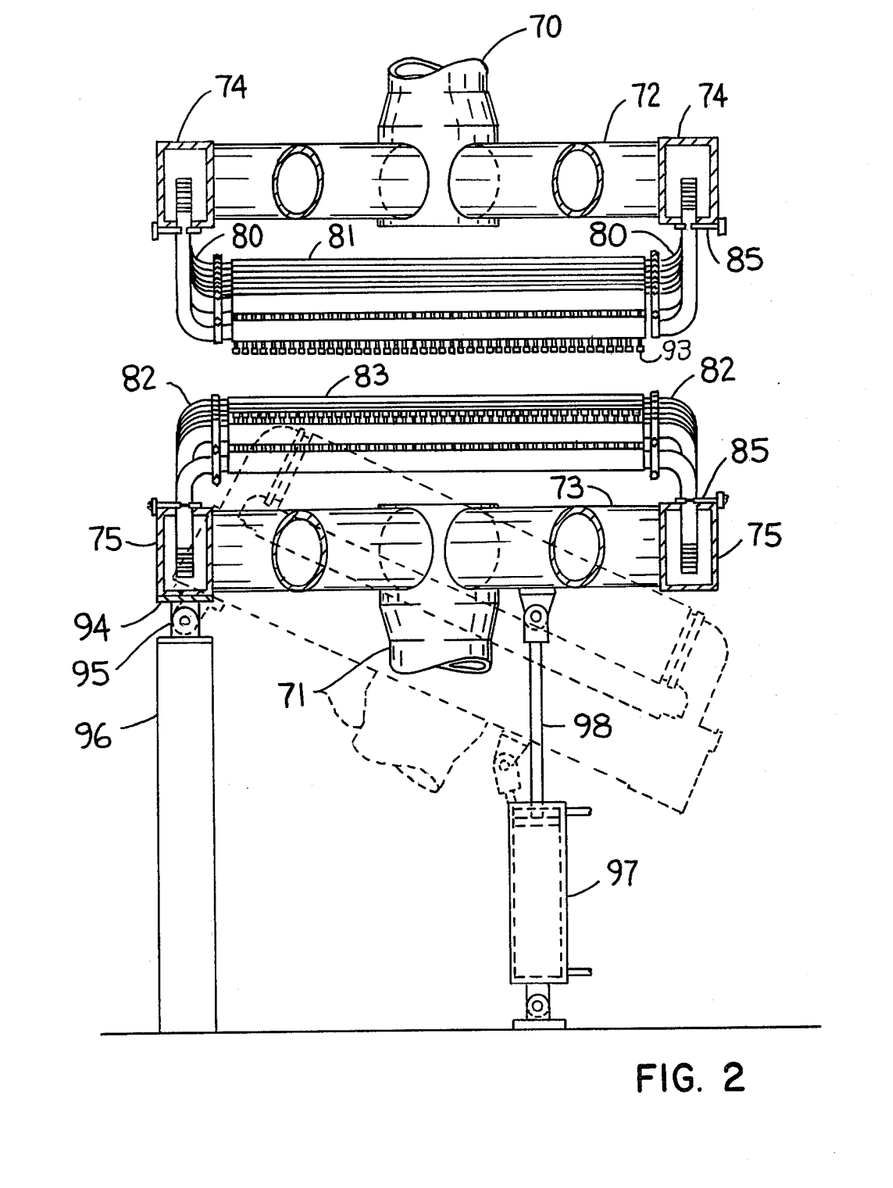
FIG. 2 is an enlarged, longitudinal sectional view of a portion of the cooling station forming part of the tempering apparatus depicted in FIG. 1.

A cooling station typical of the present invention comprises an upper vertical conduit 70 and a lower vertical conduit 71. The conduits 70 and 71 communicate with one or more blowers or compressors (not shown) through air delivery conduits (not shown) provided with control valves (not shown) in a manner typical of the prior art. A series of upper radial passages 72 communicate with the upper vertical conduit 70 and a series of lower radial passages 73 communicate with the lower vertical conduit 71. The radial passages are located in parallel planes spaced a considerable distance above and below the position occupied by a shaped glass sheet resting on an outline shaping mold 60 when the latter supports the glass sheet for cooling at the cooling station 12. The upper radial passages 72 extend from the upper vertical conduit 70 to a different one of the ends of one or the other of a pair of upper side plenums 74. The lower radial passages 73 extend from the lower vertical conduit 71 to a different one of the ends of one or the other or a pair of lower side plenums 75. The side plenums 74 and 75 are longer than a dimension of the largest glass sheet to be handled by the tempering apparatus in the direction of the length of the side plenums 74 and 75, and are located in planes spaced vertically from the glass sheet.

Figure 3:
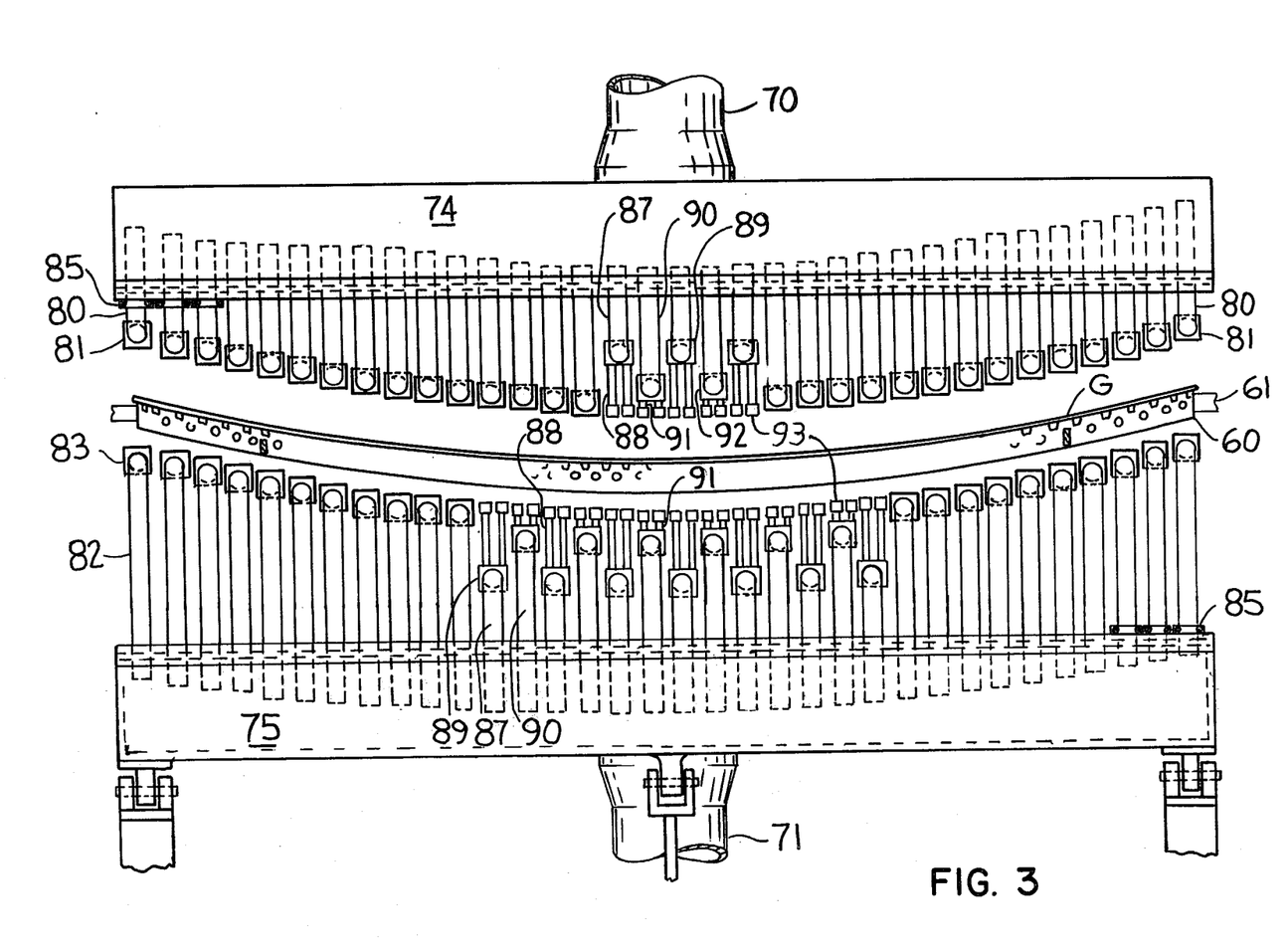
FIG. 3 is a further enlarged, sectional view transverse to the view of FIG. 2, showing how individual nozzle supply pipes are constructed and arranged to locate their delivery openings along a curved surface to deliver tempering medium toward the opposite major surfaces of a glass sheet of similar curvature supported on an outline bending mold from nozzle delivery openings spaced approximately equal distances from the adjacent major surface in the direction of tempering medium application while providing escape paths for warmed tempering medium in the manner provided by the present invention.

At the outer transverse sides of the cooling station 12, a plurality of turned, upper connecting pipes 80 interconnect openings in the upper side plenums 74 to a plurality of upper nozzle pipes 81 of rectangular cross-section. Similar turned, lower connecting pipes 82 interconnect corresponding openings in the lower side plenums 75 to a plurality of lower nozzle pipes 83, also of rectangular cross-section. Nozzle openings 84 are provided in the walls of the upper nozzle pipes 81 and the lower nozzle pipes 83 that face each other so that tempering medium supplied to the nozzle pipes 81 and 83 is delivered through the nozzle openings 84 toward the opposite major surfaces of the glass sheet portions beyond its central portion. Clamps 85 are provided to lock each of the connecting pipes 80 and 82 so that the nozzle pipes 81 and 83 extend across the cooling station 12 in curved surfaces approximating the shape of the glass sheet supported on the outline shaping mold 60.

Horizontal spaces are provided between adjacent of said upper nozzle pipes 81 for some escape of tempering medium in an upward direction from the end portions of the glass sheet parallel to the glass sheet thickness. Also, similar horizontal spaces are provided between adjacent of said lower nozzle pipes 83 for the escape of tempering medium in a downward direction from the end portions of the glass sheet parallel to the glass sheet thickness. In addition, there is sufficient space between the apertured walls of the nozzle pipes 81 and 83 and the major surfaces of the end portions of the glass sheet to allow a relatively large portion of tempering medium to escape in a direction parallel to the major surfaces of the glass sheet along the relatively short paths provided along the end portions of the glass sheet to the atmosphere beyond its longitudinal edges and its transverse edges.

However, the tempering medium directed toward the central portion of the glass sheet, if delivered using the supply system of the prior art that was just described for supplying tempering medium to the portions of the glass sheet beyond its central portion, would not be so free to escape to the atmosphere beyond the glass sheet edge. The only relatively short path of escape for tempering medium parallel to the major surfaces of the glass sheet would be over the transverse edges. Movement of tempering medium parallel to the longitudinal direction toward the longitudinal edges of the sheet is inhibited to some extent by the presence of tempering medium facing the end portions of the glass sheet and the greater length of the escape paths in the longitudinal direction compared to the transverse direction from the central portion of the glass sheet.

The present invention provides a novel construction for the central portion of the upper and lower fluid delivery systems that increase the size of the escape paths available for tempering medium to move away from the major surfaces of the central portion of the glass sheet in the direction of the glass sheet thickness. The increase in escape paths facing the central portion of the glass sheet is sufficient to compensate substantially with the relative inability of tempering medium to escape from the central portion of the glass sheet toward and beyond its longitudinal edges in directions parallel to the major surfaces of the glass sheet.

Figure 6:
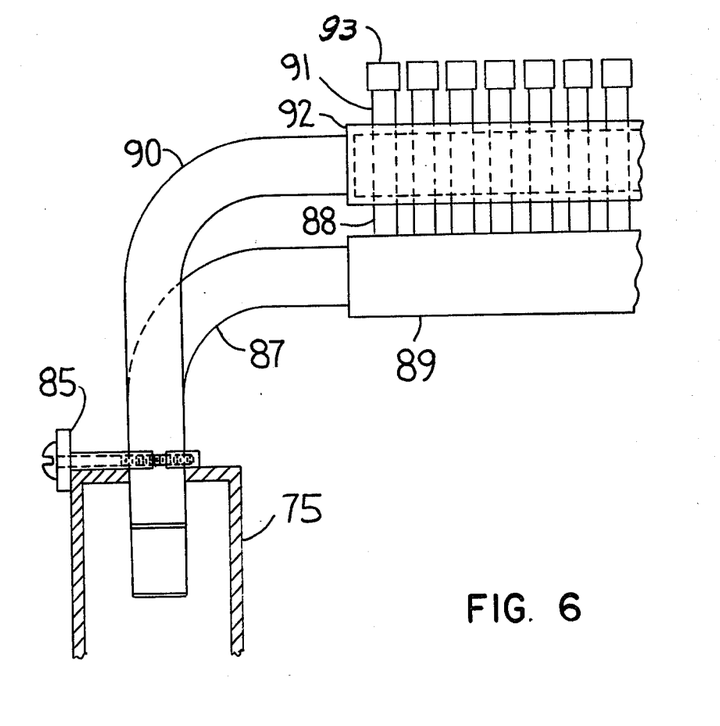
FIG. 6 is a sectional view taken along the line 6—6 of FIG. 5.

In order to accomplish this objective, a plurality of upper and lower special, curved, connecting pipes 87 having short vertical portions are coupled with special upper and lower, relatively long extensions 88 for delivering tempering medium under pressure thereto through first sets of delivery pipes 89, and a plurality of upper and lower, special, curved, connecting pipes 90 having long vertical portions are coupled with special upper and lower, relatively short extensions 91 for delivering tempering medium thereto through second sets of delivery pipes 92. Delivery pipes 89 of the first sets alternate with delivery pipes 92 of the second sets. A slotted head 93 is provided at the end of each of the relatively short extensions 91 and of each of the relatively long extensions 88. Clamps 85 are provided to secure the special curved connecting pipes 87 and 90 in locked, adjustable positions relative to apertures in the upper side plenums 74 and in the lower side plenums 75, as best seen in FIG. 6.

The length of the upper nozzles pipes 81, the lower nozzle pipes 83, and the delivery pipes 89 and 92 approximately equal one another. These lengths are greater than the largest dimension of the glass sheets transverse to the lengths of the side plenums 74 and 75. In this manner, when the outline shaping mold 60 supports one or more glass sheets thereon at the cooling station 12, the geometric center of the glass is aligned approximately with the geometric center of the cooling station, thus allowing space for relative motion between the supported glass and the cooling station 12 to avoid irridescent spots in the tempered glass.

Tempering medium is supplied under pressure from the upper side plenums 74 and the lower side plenums 75 to the alternate delivery pipes 89 and 92 for delivery through the apertured heads 93 toward the opposite major surfaces of the glass sheet G supported on the outline shaping mold 60. The lengths of the special short connecting pipes 87 differ from the lengths of the special long connecting pipes 90 by a difference greater than the cross-sections of the delivery pipes 89 and 92, thereby providing a plurality of escape paths for tempering medium between adjacent delivery pipes 89 and 92 of each set as well as increased space between the delivery pipes 89 of the first set and between the delivery pipes 92 of the second set.

The openings 84 in the nozzle pipes 81 and 83 and the openings in the slotted heads 93 comprise a pair of arrays of openings through which tempering medium is applied toward the glass sheet G when the latter occupies a position for tempering at the cooling station 12. There are two arrays of openings, one array to face each major surface of said glass sheet, to enable one to quench both major surfaces of the glass sheet simultaneously.

Figure 4:
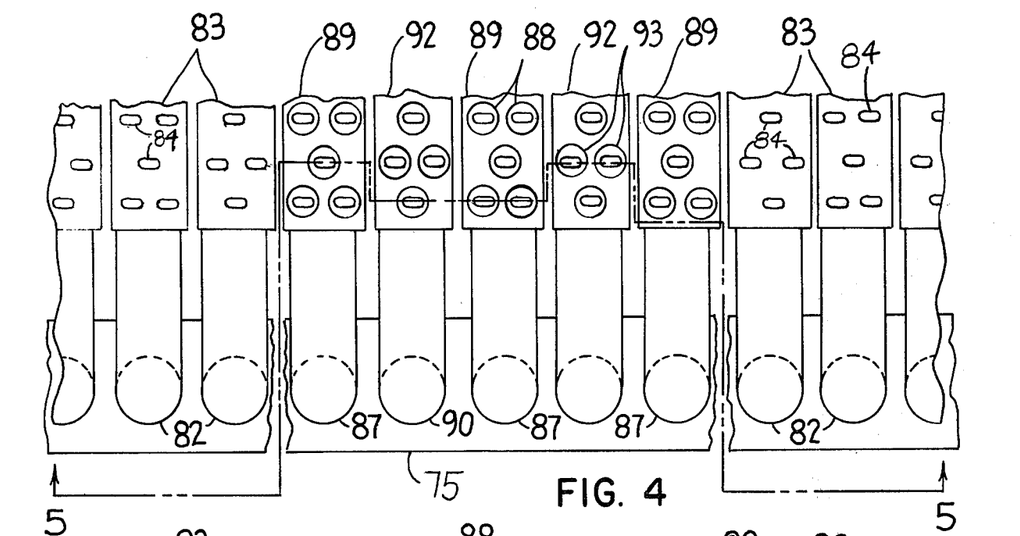
FIG. 4 is a still further enlarged, fragmentary plan view of different portions of one of a pair of nozzle arrays showing the construction and arrangement of the nozzles in the central portion of said array compared to the construction and arrangement of the nozzles in the end portions of said array.
Figure 5:
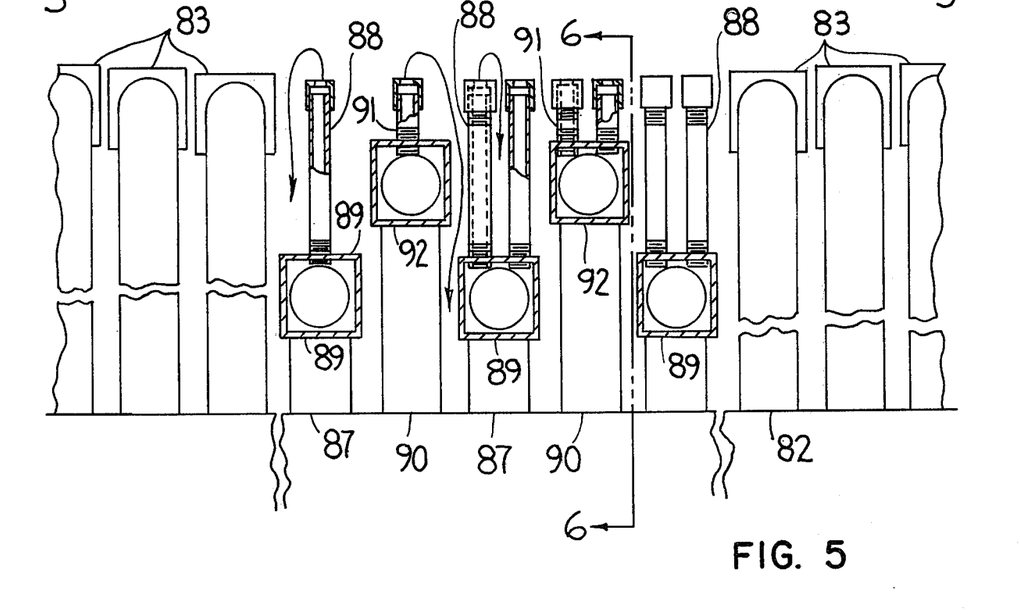
FIG. 5 is a view, partly in section and partly in end view, taken along the lines 5—5 of the fragmentary view of FIG. 4.

In a typical setup, the apertured heads 93 are provided with elliptical openings ¼ inch (6.35 mm) long by ⅛ inch (3.18 mm) wide. The openings are spaced 1⅛ inches (28.72 mm) from one another along a center row along the longitudinal center of each delivery pipe 89 and 92 of the two sets of delivery pipes 89 and 92 with double elliptical openings arranged mid-way between the openings along the center row as depicted in FIG. 4. Likewise, the nozzle openings 84 in upper nozzle pipes 81 and in lower nozzle pipes 83 are of similar size and arrangement so that each major surface of the glass sheet faces an array of openings of equal size that extends over the entire extent of the area facing the major surface.

The individual upper nozzle pipes 81 and the individual lower nozzle pipes 83 have the same cross-sectional area as the delivery pipes 89 and 92 that face the central portion of the glass sheet, namely 1⅞ inches (47.62 mm) square, spaced apart by ⅛ inch (3.18 mm) along a curved space parallel to the major surfaces occupied by the glass sheet at the cooling station 12.

The clamps 85 may be loosened to adjust the position of the various upper connecting pipes 80 and the curved connecting pipes 87 and curved connecting pipes 90 that fit into the openings along the length of the upper side plenums 74 and then tightened when the positions are so adjusted that the upper nozzle pipes 81 and the upper special delivery heads 93 lie along a surface spaced above and approximately parallel to the upper major surface of the glass sheet. Similarly, the positions of the lower nozzle pipes 83 and the lower heads 93 may be adjusted by loosening clamps 85 that hold the lower connecting pipes 82 and the curved, connecting pipes 87 and the curved, connecting pipes 90 that fit into the openings along the length of the lower side plenums 75, followed by tightening the latter clamps to position the lower nozzle pipes 83 and the lower heads 93 along a curved surface spaced below and approximately parallel to the lower major surface of the glass sheet.

Typical distances between corresponding heads 93 measured in the direction of the glass sheet thickness that are appropriate for use with different glass thicknesses are provided in Table III.

TABLE III

SUGGESTED NOZZLE TO NOZZLE SPACING FOR VARIOUS GLASS THICKNESSES

| Nominal Glass Thickness | Suggested Nozzle to Nozzle Spacing |
|---|---|
| .250 inch (6.35 mm) | 5 inches (127.0 mm) |
| .1875 inch (4.76 mm) | 4.5 inches (114.3 mm) |
| .125 inch (3.18 mm) | 4 inches (101.6 mm) |

The lower fluid delivery system may be provided with a support bracket 94 that carries a pivotal support 95 on support posts 96 at one end and piston means 97 pivotally supported at the opposite end on a piston rod 98 to permit the lower fluid delivery system to be tilted when the need arises to clear glass fragments from the lower fluid delivery system.

While blasts of tempering medium are being directed onto the glass sheets in the cooling station, it is preferred to provide relative motion between the blast heads and the glass sheets. This may be carried out by horizontally reciprocating the shuttle means 61 on which the shaping mold and glass sheets are carried. The amplitude of reciprocation is less than the difference between glass sheet length and the length of the cooling station 12.

When tempering has been completed, the shuttle means 61 advances to the full right-hand position as shown in FIG. 1 to bring the glass sheet or sheets into the unloading station. There, the glass sheets may be removed from the shaping mold by hand or by suitable mechanical means.

In a typical cycle of operation, a glass sheet is heated to a suitable temperature for shaping and tempering while it traverses the furnace 10. Then, the sheet of glass G enters the bending station 11 and its front end engages the locator frame 35 while being driven at its trailing edge by downstream roll 33. At the same time, vacuum platen 40 is being lowered to have its soft, fluffy, porous cover 43 engage the glass sheet. The previous glass sheet has been unloaded from the shuttle 61 and the shuttle has begun to move toward the bending station.

Then, the sheet of glass is lifted from the support block 25 into engagement with the cover 43 of the vacuum platen 40 and shuttle 61 comes to rest with the shaping mold 60 directly beneath the glass sheet. When the vacuum is released from the vacuum platen, the sheet of glass falls onto the shaping mold 60 and thereby becomes bent to the desired curvature by drop forming.

The shuttle immediately carries the glass sheet out of the bending station and into the cooling station 12 where it is rapidly cooled by blasts of air. Thereafter, the shuttle carries the glass sheet into the unloading station and the cycle of steps is repeated.

While the specific embodiment of the invention involves a glass sheet holder in the form of a vacuum platen, it is also envisioned that the glass sheet may be lifted and supported against a glass sheet holder at the bending station by applying hot pressurized gas or other fluid in an upward direction against the lower surface of the glass sheet and to maintain said upward flow until such time as the bending mold 60 is in its bending position beneath the glass sheet holder 40. At this time, the upward flow of pressurized gas is stopped and the glass sheet is free to drop with optional additional downward force onto the bending mold for drop forming there-against and for transportation thereon to the cooling station. The presence of a soft, fluffy, porous cover comprising a plurality of layers of fiber glass cloth interposed between the bottom surface of a highly polished metal plate of a glass sheet holder and the upper surface of the glass prevents the upper surface of the glass sheet from replicating any imperfections in the bottom plate of the glass sheet holder regardless of whether the plate is apertured with perforations or continuous.

The following operating parameters are an example of a successful operation of the above-described preferred embodiment of the invention processing glass sheets 3 millimeters thick. Under different conditions the data will vary. The furnace atmosphere was maintained at a temperature of about 1300° F. (700° C.). Electric heaters (not shown) in the furnace roof were energized to provide an upper surface temperature of the glass ranging between 10° F. (6° C.) to 50° F. (28° C.) below the bottom glass surface temperature. The gas issuing from the support block 25 in the bending zone was about 1100° to 1350° F. (600° C. to 725° C.), typically about 1250° F. (675° C.) The vacuum platen 40 attained a temperature of about 500° to 750° F. (260° to 400° C.) after a period of operation due to its proximity to the hot gases from support block 25. The glass was typically at about 1210° F. (650° C.) on its upper surface and 1250° F. (675° C.) on its bottom surface when picked up by the vacuum platen. A total of about 6 seconds elapsed from the time of glass pick-up until the initiation of tempering, at which time the glass had cooled to an overall temperature of approximately 1190° F. (640° C.). About 3 seconds elapsed from the time the glass was dropped onto the shaping mold until tempering was initiated. Altogether about 10 seconds were required for the glass to pass from the furnace exit, undergo bending, and enter the tempering station. These rapid bending rates not only indicate a high rate of throughput, but are also advantageous for the sake of attaining high degrees of temper since the rapidity of the bending process permits tempering to begin before the glass sheets have lost an appreciable amount of heat.

For glass sheets heated in the manner described in the previous paragraph, adequate tempering that provided maximum particle size not exceeding 4.25 grams per particle in both central portion and in the outside portions of tested tempered glass sheets when the glass was penetrated by a punch after tempering different glass thicknesses resulted when the heated, drop formed glass sheets were subjected to air blasts at the superatmospheric pressures enumerated in Table IV. Higher pressures of tempering medium were applied in a downward direction against the upper major surface of the glass sheet than were applied upwardly against the lower major surface. This slight pressure difference helped keep the glass sheet on the outline bending mold 60.

It is understood that the specific embodiment of the present invention has been described for use with glass sheets that are supported horizontally on outline bending molds during the cooling step of tempering. It is understood that this invention finds utility in tempering glass sheets supported in any plane. However, glass sheets suspended vertically from tongs have less need for the present invention because the smooth glass sheet surfaces provide very little obstruction to the escape of tempering medium along paths parallel to the major surfaces of the glass sheet over and beyond the glass sheet edge into the surrounding environment. Even so, the present invention provides some benefit in obtaining more efficient tempering of glass sheets, particularly glass sheets whose major dimensions exceed 0.5 meter, in any support configuration.

Descriptions of specific embodiments have been set forth herein for the sake of illustrating the best mode and other illustrative examples for practicing applicant's invention, but it should be understood that other variations and modifications as are known to those of skill in the art may be employed to provide more efficient tempering of relatively large glass sheets having a more uniform size of break pattern conforming to code requirements without departing from the spirit and scope of the invention as set forth in the claims which follow.

I claim:

1. In a method of tempering a glass sheet, wherein the method includes the steps of heating a sheet to a temperature sufficient for tempering; applying streams of tempering medium over major surfaces of the sheet at a rate sufficient to impart at least a partial temper to the sheet, the tempering medium escaping along a plurality of adjacent paths, each of the paths having a depth as measured along a line generally normal to the major surface of the glass sheet, and a width as measured along a line generally parallel to the major surface of the glass sheet, the improvement comprising:
   increasing the width and depth of the path adjacent central portion of the sheet to a fixed width and depth during the practice of the applying step, the fixed width and depth being greater than the width and depth of the paths adjacent sheet portions outside the central portion to increase the volume of tempering medium escaping from adjacent the central portion of the sheet to improve the temper of the sheet and provide a more uniform break pattern.

2. The method as set forth in claim 1 wherein the glass sheet has at least one major dimension exceeding 0.5 meter and said increasing step is accomplished by:
   applying tempering medium against the opposite major surfaces of the glass sheet through a series of openings arranged at approximately uniform distances from one or the other of the major surfaces; and
   imparting the tempering medium to the central portion of the glass sheet through alternate long extensions

TABLE IV

AIR PRESSURED APPLIED TO PRODUCE COMPRESSION STRESSES IN GLASS SHEETS OF DIFFERENT THICKNESSES THAT RESULT IN ACCEPTABLE PARTICLE SIZE OF TEMPERED GLASS FRAGMENTS

| Nominal Glass Sheet Thickness | Air to Upper Surface | Pressure Applied to Lower Surface | Surface Compression Stress |
|---|---|---|---|
| 125 mils (3.18 mm) | 7 psi (360 mm Hg) | 5.5 psi (285 mm Hg) | 18,000 psi (124 MPa) |
| 187.5 mils (4.76 mm) | 4.5 psi (233 mm Hg) | 3.75 psi (186 mm Hg) | 16,000 psi (110 MPa) |
| 256 mils (6.35 mm) | 2.5 psi (130 mm Hg) | 2 psi (110 mm Hg) | 15,000 psi (103 MPa) | extending in the direction of the thickness of the glass sheet from a first set of transverse delivery pipes and through alternate short extensions extending in the direction of the thickness of the glass sheet from a second set of transverse delivery pipes, the sets of delivery pipes being at different distances from the adjacent major surfaces of the central portion of the glass sheet to provide additional space facing the central portion of the glass sheet for the escape of tempering medium therebetween.

3. The method as set forth in claim 1 or 2 further including the steps of:

supporting the glass sheet in a substantially horizontal orientation; and applying the tempering medium at superatmospheric pressure in a downward direction against the upper major surface of the glass sheet and in an upward direction against the lower major surface of the glass sheet.

4. The method as set forth in claim 3 wherein the tempering medium is applied downwardly at a higher pressure against the upper major surface than the tempering medium applied upwardly against the lower major surface.

5. The method as set forth in claim 4 further including the step of:

providing relative motion between the glass sheet and the tempering medium.

6. An apparatus for tempering a glass sheet, comprising:

first means for directing a tempering medium;
second means for directing a tempering medium;
means for mounting said first and second directing means in spaced relation to one another to direct tempering medium toward one another through a common tempering position; and
each of said directing means comprising:
  a central fixed array of delivery means, said central fixed array of delivery means spaced a fixed distance from the common tempering position;
  a plurality of spaced fixed outer array of delivery means about said central array of delivery means, said spaced fixed outer array spaced a distance from the common tempering position that is less than the fixed distance of the central fixed array; and
  a plurality of elongated pipes having a cross-sectional dimension substantially less than the surface dimension of said fixed outer array facing the common tempering position, each of said pipes extending from said central fixed array of delivery means toward the common tempering position and terminating short of the common tempering position a distance approximately equal to the spaced distance from the common tempering position as the spaced outer fixed array of delivery means, said plurality of elongated pipes and spaced central fixed array of delivery means provides increased volumetric tempering medium escape path in a direction generally parallel to and normal to the common tempering position for central portion of said directing means as compared to outer portions.

7. In an apparatus for tempering a glass sheet, wherein the apparatus includes means for applying streams of tempering medium toward one another through a tempering position, a plurality of escape paths defined by outer surface portions of the applying means for spent tempering medium to escape, each of the paths having a depth as measured along a line generally normal to the tempering position and a width as measured along a line generally parallel to the tempering position, the improvement comprising:

first means for fixing the width and depth of the escape paths adjacent central portion of the tempering position to provide central escape paths having a predetermined cross-sectional area;

second means for fixing the width and depth of the escape paths outside the central portion of the tempering position to provide outer escape paths having a cross-sectional area less than the cross-sectional area of the central escape paths to increase the volume of spent tempering medium escaping through each central escape path from adjacent central portion of the tempering position to improve temper and provide a more uniform break pattern for a sheet to be tempered.

8. The apparatus as set forth in claim 7 wherein the applying means include:

first means for directing a tempering medium;
second means for directing a tempering medium; and
means for mounting said first and second directing means in spaced relation to one another to direct tempering medium toward one another through the common tempering position;
said first fixing means includes a central fixed array of delivery means, said central fixed array of delivery means spaced a fixed distance from the common tempering position;
said second fixing means includes a plurality of spaced fixed outer array of delivery means about said central array of delivery means, said spaced fixed outer array spaced a distance from the common tempering position that is less than the fixed distance of the central fixed array; and
said central fixed array of delivery means further includes a plurality of elongated pipes having a cross-sectional dimension substantially less than the surface dimension of said fixed outer array facing the common tempering position, each of said pipes extending from said central fixed array of delivery means toward the common tempering position and terminating short of the common tempering position a distance approximately equal to the spaced distance from the common tempering position as the spaced outer fixed array of delivery means, said plurality of elongated pipes and spaced central fixed array of delivery means provides increased volumetric tempering medium escape path in a direction generally parallel to and normal to the common tempering position for central portion of said directing means as compared to outer portions.

9. The apparatus as set forth in claim 6 or 8 further including:

a first pair of side plenums extending along opposite sides of each of said arrays a distance greater than the major dimension of the largest glass sheet to be tempered in the direction of the dimension; and said delivery means of said central array and of said outer array have lengths greater than a second major dimension of the largest glass sheet extending transverse to the first dimension.

10. The apparatus as set forth in claim 9 further including:

a conduit on each side of the tempering position; and
a radial passage for communicating between one or the other of said conduits and each end of one or the other of said plenums for delivering tempering medium through said conduits, said radial passages, said side plenums, and said outer and central array.

11. The apparatus as set forth in claim 10 wherein said arrays of openings are arranged horizontally and in vertically spaced relation to one another to form an upper array and a lower array, further comprising:
an outline bending mold;
means for moving said mold intermediate said upper and lower arrays.

12. The apparatus as set forth in claim 11 further including:
means for reciprocating said outline bending mold relative to said upper and lower arrays.

13. The apparatus as set forth in claim 11 further including:
means for pivoting said lower array away from the tempering position.

* * * * *